United States Patent Office 2,878,253
Patented Mar. 17, 1959

2,878,253
NICOTINIC ACID ESTER OF MORPHINE

Konrad Lothar Zirm, Steiermark, and Alfred Pongrotz, Graz, Austria

No Drawing. Application October 7, 1957
Serial No. 688,405

Claims priority, application Austria May 4, 1956

1 Claim. (Cl. 260—285)

The present invention relates to a new nicotinic acid ester which is of special importance because of its excellent pharmacological properties.

It has been discovered, and this constitutes the object of the present invention, that this new nicotinic acid ester can be obtained if nicotinic acid or compounds containing the nicotinic acid radical are reacted with morphine. For producing the esters, suitable functional derivatives of the nicotinic acid, for example, nicotinic acid anhydride or nicotinic acid halides in the form of their halogen hydracid salts, are condensed with morphine. Nicotinic acid can be reacted directly with the morphine in the presence of water absorbent agents, as for instance phosphorus oxychloride. In case of the use of nicotinic acid halide-halogen hydracid salts, especially nicotinic acid chloride-hydrochloride or in the case of nicotinic acid, the condensation with the morphine is preferably effected in the presence of tertiary bases. As examples of such tertiary bases pyridine, quinoline and dimethyl aniline may be mentioned. If necessary, the reaction can be effected also with an addition of inert solvents, as, for example, alkylbenzenes or chlorobenzenes.

The pharmacological properties of the morphine are modified in a remarkable and valuable manner by the esterification with nicotinic acid.

The following examples will further illustrate how the invention may be carried out. The invention is, however, not restricted to these examples.

*Example 1*

11.1 parts of morphine hydrochloride $.3H_2O$ were heated several hours to a temperature of 100° C. for the purpose of removing the water and then the dried morphine-hydrochloride was stirred into 60 parts of molten nicotinic acid anhydride at a temperature of about 120° C. This temperature was maintained about one hour under frequent stirring; the reaction mass was then allowed to cool, mixed with 300 parts by volume of water and 55 parts by weight of sodium bicarbonate and gently heated. During these process steps the abundant nicotinic acid dissolved as the sodium salt and the reaction product remained in the form of a finely crystalline powder. After adding a minor amount of sodium carbonate and longer standing, the crystalline powder was vacuum filtered, washed with water and dried. 13.4 parts of the raw compound were obtained. By dissolving it in 125 parts by volume of 2.5% hydrochloric acid, decolourizing, if necessary, and adding a solution of sodium bicarbonate to the filtrate, 11.4 parts of dinicotinoyl-morphine were obtained in the form of snow-white crystals having a melting point of 175.0° to 175.5° C. The compound obtained contained in wet condition water of crystallization which is given off, however, when heated to a temperature of 100° C. The compound is practically insoluble in water and forms an easily soluble hydrochloride.

The condensation may also be effected with the free morphine base.

*Example 2*

8 parts of dry morphine hydrochloride and 40 parts of nicotinic acid chloride-hydrochloride were introduced into 60 parts by volume of pyridine at room temperature one after the other in such a way that the temperature did not exceed 25° to 30° C. The mixture was then stirred at this temperature for 6 to 8 hours. After this time the reaction mixture became pulpy and it was dissolved in the about 200-fold amount of water (calculated on the amount of morphine hydrochloride used). Sodium bicarbonate was added to this solution, which if necessary, was filtered until no further carbon dioxide was evolved and then a solution of sodium carbonate was added up to the point at which on further addition no further precipitate was formed. The compound precipitated first in form of fine droplets which soon transformed into crystals which were easily filterable. After washing with water and drying 10 parts of the new compound were obtained. The compound is identical with the compound obtained according to Example 5.

For purification it was dissolved in about 0.1 n-hydrochloric acid under gentle heating, the solution then decolourized, filtrated, precipitated with a solution of sodium carbonate and sodium bicarbonate, the precipitate filtered off, washed with water and dried. The substance melts at a temperature of 174.5° to 175° C., giving off thereby the water of crystallization.

*Example 3*

19 parts of morphine hydrochloride $.3H_2O$ after removing the water of crystallization were suspended together with 19 parts of nicotinic acid in 80 parts by volume of pyridine. 15 parts of phosphorus oxychloride were then added in portions under incipient suitable cooling and constant stirring, simultaneously taking care that the temperature did not exceed 25° C. The reaction mixture was allowed to stand at room temperature for 18 hours and then mixed with 1000 parts by volume of water. As soon as dissolution had taken place, the water as well as the pyridine were removed by distillation, advantageously in a vacuum. The remaining liquid was mixed with water to yield 400 parts by volume, sodium bicarbonate was added until the evolution of carbon dioxide ceased and finally a small quantity of sodium carbonate was added. Early crystals were separated from the liquid; after standing several hours, the dinicotinoyl-morphine obtained was vacuum filtered, washed with water and dried. Yield: 19 parts. After dissolving in n-hydrochloric acid decolourizing with activated carbon a sodium-bicarbonate-sodium carbonate solution was added to the filtrate. An absolutely white product was obtained which melts at a temperature of 174.5–175.0° C. This product was identical with the product obtained according to Examples 1 and 2.

The morphine-nicotinic acid ester has proved in pharmacological and clinical tests a new and very effective analgesic which distinguishes itself in comparison with other alkaloids, as, for example, the morphine hydrochloride, by an essentially more intensively analgesic effect with faster action and nearly twice as long a duration of the analgesic effect. Its compatibility is very great and no undesired side-symptoms resulted during clinical observations.

This is a continuation-in-part of our earlier application S. N. 619,116, filed October 30, 1956.

We claim:

The dinicotinoyl-morphine ester having a melting point of 174.5–175.5° C.

References Cited in the file of this patent

UNITED STATES PATENTS

| | | |
|---|---|---|
| 2,510,164 | Hartmann | June 6, 1950 |
| 2,714,109 | Woodward | July 26, 1955 |

FOREIGN PATENTS

| | | |
|---|---|---|
| 724,256 | Great Britain | Dec. 16, 1952 |

OTHER REFERENCES

Donatelli et al.: Chem. Abs., vol. 49, p. 3390 (1956); abst. of Minerva Medica, 1951, p. 1117.

UNITED STATES PATENT OFFICE

CERTIFICATE OF CORRECTION

Patent No. 2,878,253                                                          March 17, 1959

Konrad Lothar Zirm et al.

It is hereby certified that error appears in the above numbered patent requiring correction and that the said Letters Patent should read as corrected below.

In the grant, lines 1 and 2, and line 11, and in the heading to the printed specification, lines 3 and 4, name of second inventor, for "Alfred Pongrotz", each occurrence, read -- Alfred Pongratz --.

Signed and sealed this 29th day of September 1959.

(SEAL)
Attest:

KARL H. AXLINE                                                    ROBERT C. WATSON
Attesting Officer                                         Commissioner of Patents